June 24, 1958 R. L. KERR 2,840,111
DAMPENER AND FLOATING BARRIER SEAL
Filed July 16, 1953 6 Sheets-Sheet 1

RALPH L. KERR
INVENTOR.

BY Jacks W. Hayden
ATTORNEY

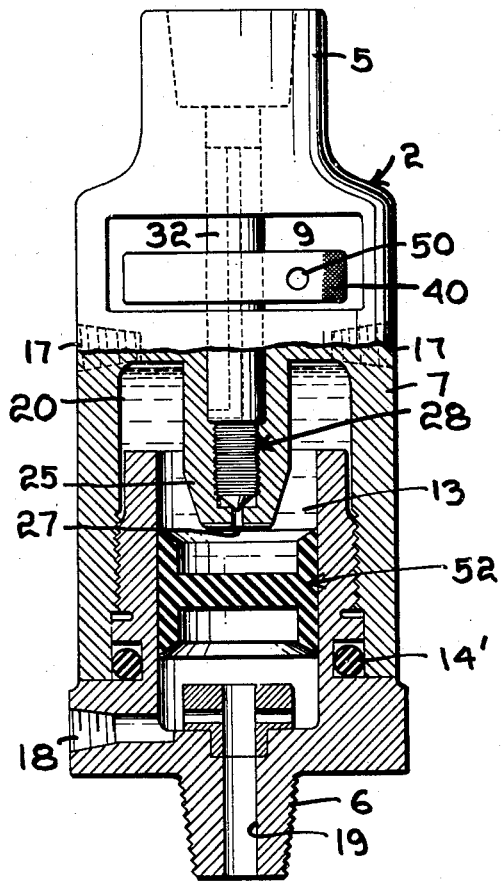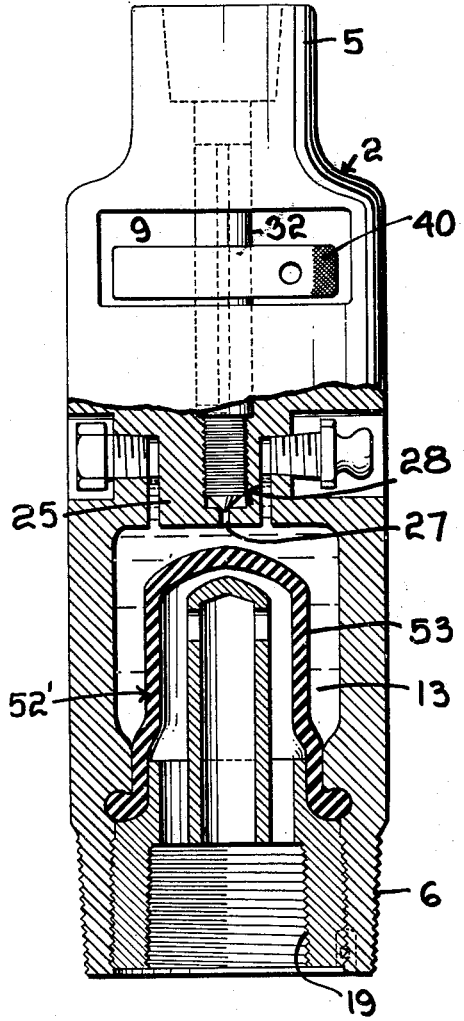
Fig. 3
Fig. 4
RALPH L. KERR
INVENTOR.
BY Jack W. Hayden
ATTORNEY June 24, 1958  R. L. KERR  2,840,111
DAMPENER AND FLOATING BARRIER SEAL
Filed July 16, 1953  6 Sheets-Sheet 3

RALPH L. KERR
INVENTOR.

BY Jack W. Hayden

ATTORNEY

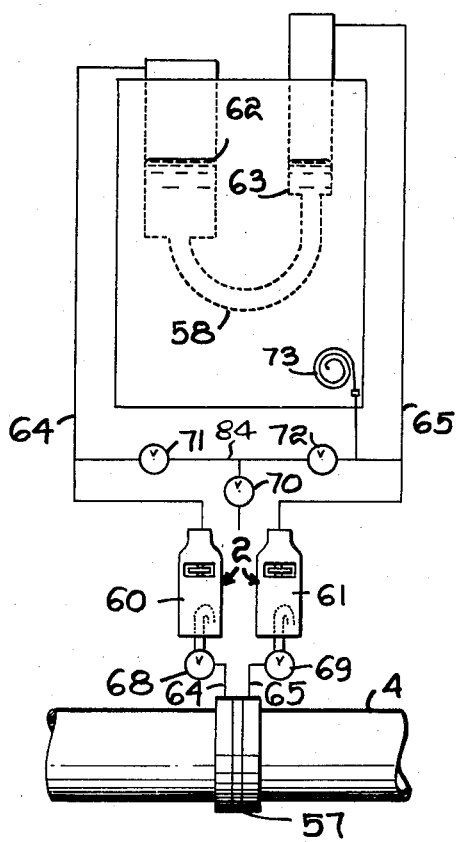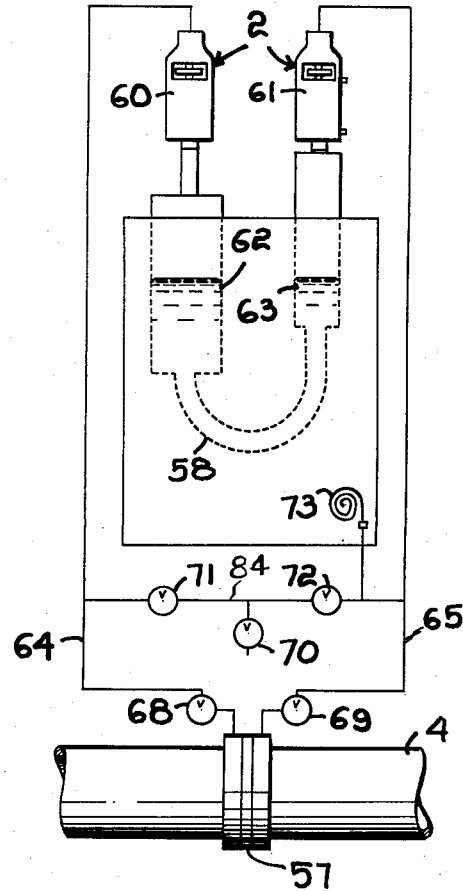

RALPH L. KERR
*INVENTOR.*

BY Jack W. Hayden

ATTORNEY

June 24, 1958  R. L. KERR  2,840,111
DAMPENER AND FLOATING BARRIER SEAL
Filed July 16, 1953  6 Sheets-Sheet 6

RALPH L. KERR
INVENTOR.

BY Jack W. Hayden

ATTORNEY

United States Patent Office 2,840,111
Patented June 24, 1958

2,840,111

DAMPENER AND FLOATING BARRIER SEAL

Ralph Lynn Kerr, Columbus, Tex.

Application July 16, 1953, Serial No. 368,428

4 Claims. (Cl. 138—26)

The present invention relates to a device for dampening pressure impulses.

In order to obtain a correct and true indication of pressure conditions existing in any given flow line at any given time it is necessary to dampen the periodic pressure impulses in the line that arise from various conditions. For example, reciprocating pumps create a pressure impulse with each stroke, and if an indicating mechanism such as a gauge is attached directly to the flow line in which the pressure impulses are created, the needle of the gauge mechanism is continually moving between a maximum and minimum reading with each pump stroke.

Also, surges of pressure impulses due to synchronizing of pump beats creates a similar problem in attempting to determine the true pressure conditions existing.

Present type pulsation dampeners which are used with instruments, or responsive means for indicating pressure conditions existing in a flow line, requires that the instrument itself, or the operating mechanism of the responsive means, be completely filled with liquid. Such liquid filling of the instrument or liquid filling of the operating mechanism of the responsive means is necessary because the present day pulsation dampeners rely for their successful operation on a relatively small displacement of a diaphragm. The movement of such diaphragm is transmitted through the liquid in the instrument, or through the liquid in the operating mechanism of the responsive means, to the indicating needle of the instrument or means.

Therefore, in order for the small displacement of the diaphragm to both dampen the impulse to create a dampened impulse which is correct and can be detected, the instruments must be filled with liquid to make them as sensitive as possible in order that such instruments or the mechanism of the means will respond to the small displacement of the diaphragm.

It seems obvious from the above that the type of dampeners now in use have certain inherent disadvantages and limitations as to accuracy and operation. For example, since it is necessary that an instrument or indicating means such as a Bourdon gauge be filled with liquid in order that pressure impulses imparted to the diaphragm or displaceable member in the dampener may be picked up on the instrument, a great deal of time and difficulty is required in order to properly fill the Bourdon gauge with liquid prior to connecting it with the liquid filled pulsation dampener. The system thus filled, including both gauge and the dampener, must then be tested for leaks so as to assure proper response of the instrument to the dampened pressure impulses.

Also, if any pressure is built up in the gauge or in the pulsation dampener attached thereto then, of course, this necessitates release of such liquid pressure prior to operation with the unit in order to insure accurate readings on the instrument in response to the pressure impulses imparted to the liquid filled pulsation dampener and liquid filled gauge.

The present invention provides a device for dampening pressure impulses which eliminates the necessity of filling the instrument or responsive means with liquid which is to be operatively attached with such dampener.

Another object of the invention is to provide a device for dampening pressure impulses and eliminates hunting of a gauge needle or other type recording or responsive means operatively connected therewith.

A further object of the invention is to provide a pulsation dampener to which an air filled, or non-liquid filled responsive means may be attached.

Still a further object of the invention is to provide a pulsation dampener to which an air filled, or non-liquid filled pressure gauge may be attached.

Still a further object of the invention is to provide a pulsation dampener which eliminates the necessity of filling a pressure gauge with liquid prior to connection with such dampener.

A further object of the invention is to provide a device for dampening pressure impulses including a body, a liquid reservoir therein, there being an opening in said body for imparting pressure impulses to said reservoir and an outlet in said body for conveying pressure impulses from said reservoir and a variable restriction means for dampening the pressure impulses conveyed from said reservoir.

Yet a further object of the invention is to provide a device for dampening pressure impulses comprising a body, a liquid in said body, there being an opening in said body for conducting pressure impulses to said liquid and there being an outlet in said body for conveying pressure impulses from said body, an air filled indicating means connected to said outlet and adjustable restriction means for dampening the pressure impulses through said outlet to said indicating means.

Still another object of the invention is to provide a device for dampening pressure impulses including a body, a displaceable barrier therein, a liquid reservoir formed by said body and said barrier, a liquid in said reservoir, there being an inlet in said body for conducting pressure impulses against said barrier, there being an outlet in said body for movement of said liquid in response to displacement of said barrier by the pressure impulses, and means for dampening the movement of said liquid through said outlet.

A still further object of the invention is to provide a pulsation dampener having means for connection with an air filled indicating or responsive means, a liquid reservoir and an outlet therefrom for conveying pressure impulses to said reservoir and from said reservoir to said indicating or responsive means, and a variable restriction in said outlet for dampening the impulses imparted from said reservoir to said indicating or responsive means.

Still another object of the invention is to provide a pulsation dampener for use with air filled pressure gauges which provides means for regulating the amount of dampening.

Still a further object of the invention is to provide a pulsation dampener for use with an air filled indicating means which pulsation dampener is constructed and arranged so as to tune out the pulsations of the indicating media after installation of the dampener with such means.

Still a further object of the invention is to provide a pulsation dampener which eliminates the necessity of providing a liquid filled indicating means.

Other objects and advantages will become more readily apparent from a consideration of the following description and drawings wherein:

Fig. 3 is a vertical sectional view partly in elevation illustrating still another embodiment of the invention;

Fig. 4 is a vertical sectional view partly in elevation illustrating another embodiment of the invention;

Figures 1, 2:
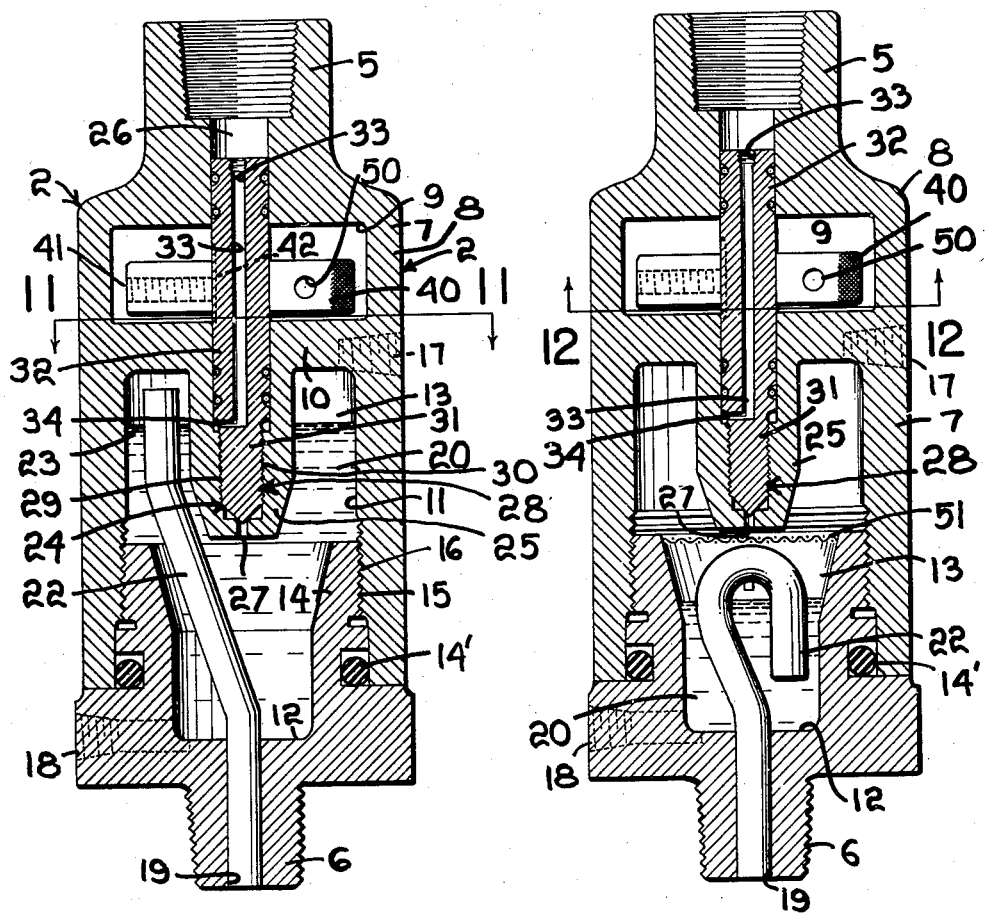
Fig. 1 is a vertical sectional view illustrating an embodiment of the invention.
Fig. 2 is a vertical sectional view illustrating another embodiment of the invention.
Figure 6:
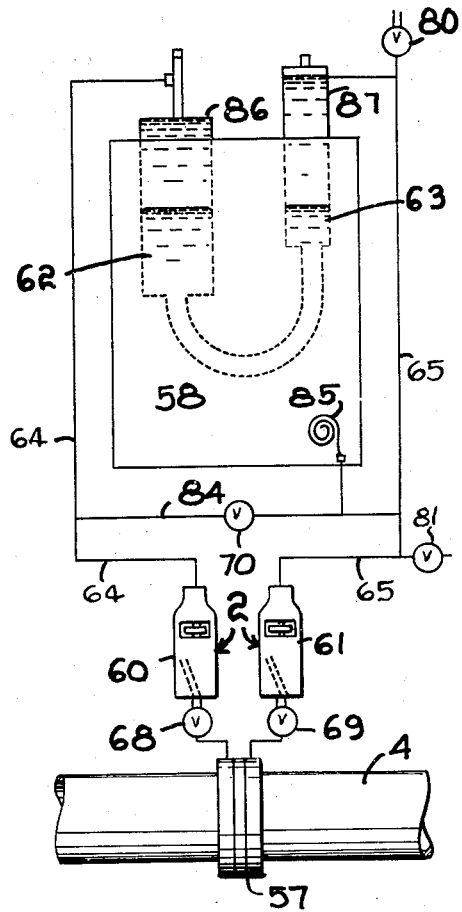
Figure 9:
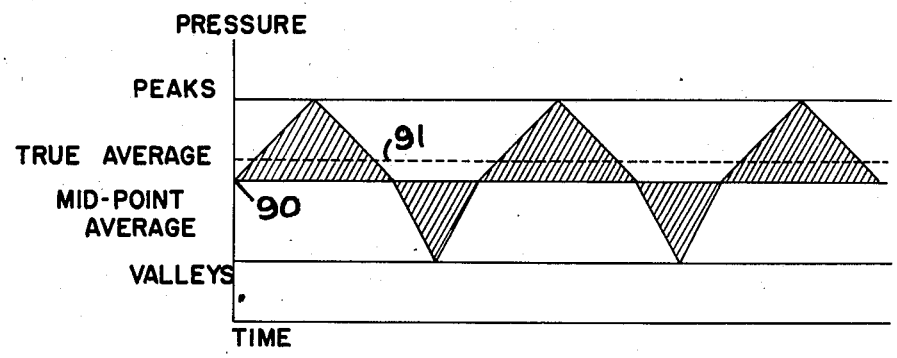
Figure 10:
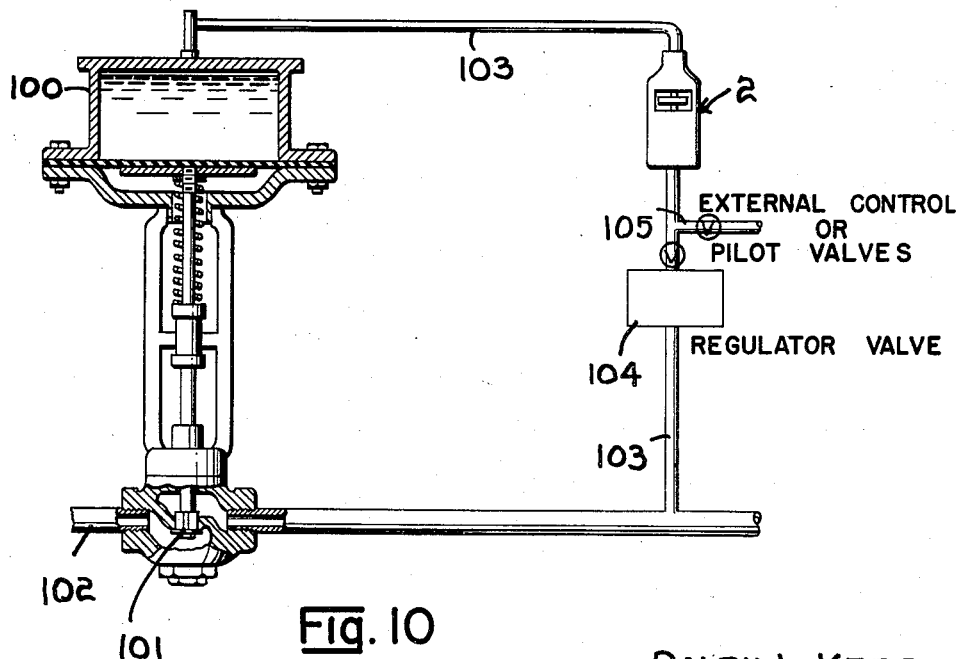
Figure 11:
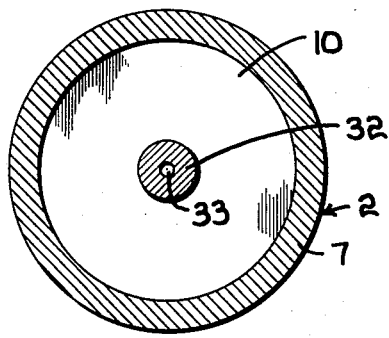
Figure 12:
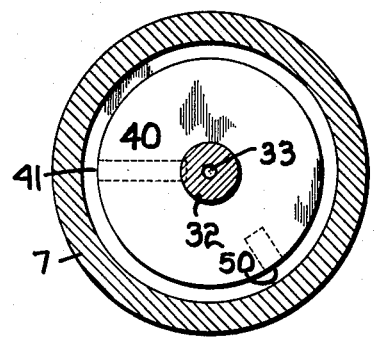

Fig. 6 schematically illustrates a form of the invention as it may be used with an orifice flow meter;

Fig. 7 schematically illustrates a modification of the invention in use with an orifice flow meter which is air filled;

Fig. 8 schematically illustrates the invention as used with an orifice flow meter and modified to provide mercury traps;

Fig. 9 is a graph illustrating a typical pulsating pressure such as that found on recording charts;

Fig. 10 illustrates the invention and shows one manner of use as a control;

Fig. 11 is a sectional view on the line 11—11 of Fig. 1;

Fig. 12 is a sectional view on the line 12—12 of Fig. 2; and

Figure 13:
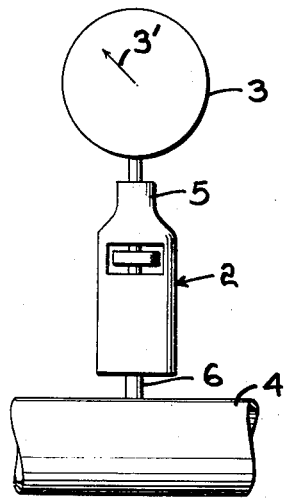

Fig. 13 illustrates the present invention connected to an air filled pressure indicating means such as a Bourdon gauge.

The invention is illustrated generally by the numeral 2 and is shown in Fig. 13 of the drawings as being connected to an air filled pressure indicating instrument such as a Bourdon gauge 3, which instrument is being used for indicating the pressure existing in flow line 4. The dampener 2 is provided with suitable connections 5 and 6 for engagement with the instrument 3 and flow line 4 respectively. An indicating needle 3' is illustrated on the instrument for indicating the pressure in the flow line 4.

As shown in Fig. 13, the pressure impulses created in flow line 4 will be transmitted to the dampener 2 which will in turn dampen the impulses and transmit such dampened impulses to the instrument 3 which will indicate the pressure existing in flow line 4 by means of the indicator 3' in the instrument. The present invention provides a pulsation dampener with which an air filled indicating means such as, for example, a Bourdon gauge may be used and provides a means of adjusting the dampening effect of such pulsation dampener.

Reference is now made to Fig 1 of the drawings for a detailed discussion of the embodiment there illustrated. The invention includes a body 7, which body may be of any suitable configuration. The upper portion 8 of the body is provided with a window 9 extending laterally therethrough for a purpose to be more fully noted hereinafter.

Below the window is a partition 10 which, with the side wall 11 and bottom 12 of the body forms a liquid reservoir 13. The bottom 12 of the body may be in the form of a removable plug whereby access may be had to the reservoir 13 for cleaning it from time to time if necessary. The body bottom 12 is provided with an upstanding portion 14 having threads 15 thereon for engagement with threads 16 on the wall 11 of body 7 and a seal 14' is provided to prevent leakage of fluid from the reservoir 13.

A fill plug 17 for the reservoir 13 is shown in dotted line and a drain plug 18 is also shown in dotted line.

An inlet 19 through body 3 from the pressure line 4 to the reservoir 13 is provided whereby pressure impulses in such line may be conveyed to the reservoir 13. A liquid 20 in the reservoir 13 is provided whereby the effect of said pressure impulses may be dampened and conveyed through the outlet opening generally denoted by 24 to the air filled instrument connected at 5 to the dampener. A tube or standpipe 22 in the inlet 19 is used to maintain the liquid level 23 in the reservoir.

Particularly, attention is directed to the volume of the reservoir 13 in that such volume is relatively large compared to the volume of the Bourdon tube.

Therefore, sufficient displacement in the Bourdon tube gauge 3 will occur when liquid 20 is displaced in the reservoir 13, so as to move the needle 3' in accordance with the pressure existing in the flow line being measured.

As previously mentioned, in order to obtain a true reading of the pressure existing in the line to which a Bourdon gauge or other indicating means may be attached, it is necessary to dampen the periodic pressure impulses to eliminate or reduce "hunting" of the needle 3'. The pressure impulses may be caused by the pulsations of the pumping mechanism which exert a force against the fluid, whether such fluid be a liquid or a gas in the line to which the pulsation dampener and gauge or indicating means may be attached. In order to accurately read the gauge it is necessary to eliminate the fluctuation of the gauge needle or the indicating mechanism of any pressure responsive means which is used for making the pressure measurements.

The present invention provides a mechanism whereby an air filled indicating or responsive means such as, for example, a Bourdon gauge, may be attached directly to the pulsation dampener without the necessity of first filling such gauge with a liquid in order that true or correct readings of an existing pressure by means of the gauge are obtained. This is accomplished by the arrangement of the fluid reservoir 13 and a restriction means which forms a small leakage passageway of adjustable length, in the outlet 24 of the body 7 which conveys the pressure impulses to the measuring gauge.

For the purpose of explaining the invention, the indicating means will be referred to as a Bourdon type gauge. However, the invention is not limited to this type indicating means and any type of pressure responsive indicating means may be used without departing from the scope of the invention.

The outlet 24 extends longitudinally of body 7 through downward projection 25 of the partition 10 and communicates with gauge connection 5 as shown at 26. An opening 27 of the outlet 24 in the lower end of projection 25 communicates the reservoir 13 with the outlet 24.

A restriction means 28 is arranged in the outlet 24 for dampening the movement of fluid therethrough from reservoir 13 in response to pressure impulses in said reservoir 13. Such restriction means causes a time lag in the movement of liquid from the reservoir to the gauge and back into the reservoir 13 after a pressure impulse has moved it through opening 27 to outlet 24 and therefore before all of the liquid has leaked back into such reservoir, a new pressure impulse will cause an additional movement of fluid from the reservoir to outlet 24.

Since the air filled indicating gauge is connected at 5 to the pulsation dampener and thence to outlet 24, movement of fluid from the reservoir 13 through outlet 24 causes a compression of the air in the indicating means, such as for example, a Bourdon gauge and effects movement of the gauge needle 3' so that a reading is noted. In view of the time lag in the leakage of fluid back to reservoir 13, it seems obvious that before such liquid has all leaked back to the reservoir 13 and thereby allowed the needle on the gauge to reach a minimum, movement of fluid caused by additional pressure impulses will replenish that tending to leak back to the reservoir 13 so that fluctuations in the needle gauge may be thus inhibited and minimized. Similarly, as the pressure builds up to force the liquid from reservoir 13 a time lag is introduced by the restriction which, in effect, limits the amount of liquid flowing into the gauge element and thereby prevents the needle 3' from reaching a maximum reading.

The restriction means comprises a threaded area 29 in the outlet 24 with which is engaged the threaded area 30 on the lower end 31 of the spindle or restrictor 32. The cooperating threaded areas on the spindle 32 and the outlet 24 provide a means for restricting movement of the fluid reservoir 13 to act on the air filled gauge connected at 5.

The spindle 32 also provides a means for communicating portion 26 of outlet 24 and the gauge connection 5 and the reservoir 13. To this end, an opening 33 extends longitudinally through such spindle and lateral opening 34 in the lower end of said spindle intersects such opening or passage 33 which in turn communicates with reservoir 13 by means of the restriction means 28 in the lower end of outlet 24. The upper end of the opening 33 is open to the portion 26 of outlet 24 and to the gauge connection 5.

The restriction means 28 is variable so that the amount of dampening may be regulated. A disk 40 positioned in window 9 is connected to the spindle by suitable means such as Allen screw 41 engaging in groove 42 on the periphery of the spindle. Rotation of the disk increases or decreases the length of the engaged threaded areas 29 and 30 respectively thereby increasing or decreasing the length of the restriction which increases or decreases the dampening effect.

When the spindle 32 is in the position illustrated in Fig. 1, communication between outlet 24 and reservoir 13 is cut off since the lower end 31 of the spindle is seated on opening 27. Similarly when the smallest number of threads are engaged on the spindle and the outlet, the dampening effect is at a minimum, since the length of the restriction is the shortest.

The present invention provides a pulsation dampener which eliminates clogging of the restriction means 28 since the same fluid is moving back and forth in such restriction and in effect the liquid in the reservoir provides a seal pot, or liquid barrier between the pressure line and the restriction and prevents contamination of the restriction means 28 by foreign matter which may pass into the reservoir from opening 19 from the pressure line.

The present invention may be attached to a pressure line and the pulsation of the gauge needle or other indicating mechanism can then by eliminated by "tuning out" the pulsation effect. In other words, the variable restriction means 28, by reason of its construction and arrangement and by reason of the fact that the amount and length of restriction can be regulated or adjusted after the mechanism has been installed simply by adjusting the spindle 32 until the minimum amount of fluctuation or pulsation of the indicating mechanism or needle 3' occurs while simultaneously yielding a continuous reading on the gauge.

An opening 50 in the disk is provided whereby a nail or other suitable instrument may be engaged therein to move the disk if necessary.

From the foregoing description it can be readily seen that a pulsation dampener is provided which allows an air filled indicating means, such as a Bourdon gauge, to be attached directly to the pulsaition dampener. It is not necessary to fill such gauge, or indicating means, since the ratio of the volume of the reservoir 13 compared to the volume of the Bourdon tube is large and movement of the fluid through the threaded restriction means 28 not only dampens the pressure impulses imparted to the liquid reservoir, but such movement serves to compress the air in outlet 24 and attached Bourdon gauge sufficiently so as to be properly noted on such gauge.

The type fluid used in liquid reservoir 13 will, of course, depend upon the particular use to which the pulsation dampener is to be put, but an oil of S. A. E. 10 or 20 weight serves quite satisfactorily.

It should also be noted that the present invention permits gauges to be changed quickly and easily since it is not necessary to fill such gauges with liquid as heretofore required.

The present invention also eliminates errors in the gauge reading due to temperature changes, since temperature changes have little if any effect on air filled gauges as compared with liquid filled gauges heretofore used.

In Fig. 2 an alternate modification is illustrated wherein the liquid reservoir serves as an oil bath and the pressure injected into the reservoir passes through the opening 19 and into the threaded restriction means 28. The pressure in this event would then serve to compress the air in outlet 24 and in the connected indicating means such as the Bourdon gauge. A screen 51 is provided above the fluid level in the liquid reservoir to serve as a filter for filtering the pressure medium prior to its entering the threaded restriction. This inhibits clogging of the threaded restriction 28 which might necessitate cleaning of the device or readjustment of the position of the spindle in the opening in order to obtain a proper reading.

The tube 22 is doubled back so as to discharge the pressure medium from the flow line into the liquid which washes such medium and in cooperation with the screen 51 aids in maintaining it clean for discharge to the outlet 24 for actuation of the gauge in a manner similar to that as discussed herein.

In Fig. 3, a displaceable barrier or piston 52 is arranged in the reservoir 13 and pressure impulses from the flow line act through opening 19 to move such barrier which imparts the pressure impulses to the liquid 20 on the other side of such barrier, which causes the liquid to operate the air filled pressure gauge connected to the dampener at 5.

In Fig. 4, a displaceable barrier 52' in the form of a diaphragm membrane or bellows 53 is provided in the reservoir with the opening 19 arranged to impart pressure impulses from the flow line to the reservoir and displace the barrier so as to cause the liquid to operate the air filled gauge connected to the dampener at 5.

In the modifications illustrated in Figs. 3 and 4 the liquid 20 from the reservoir moves through restriction means 28 in outlet 24 as previously discussed with regard to Figs. 1 and 2. Also, as discussed with regard to the forms of the invention illustrated in Figs. 1 and 2, the seal pot arrangement of the invention in combination with the restriction means 28 eliminates necessary use of a liquid fill gauge with the invention.

It should be noted that use of partially liquid filled gauges is not precluded with the present invention, since the presence or absence of liquid, as a contamination, or otherwise, in the pressure gauge will not effect the operation of the invention.

Figure 5:
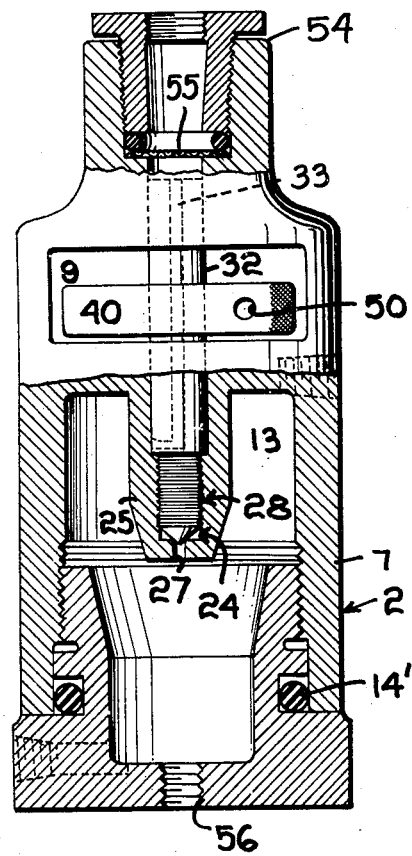
Fig. 5 is a vertical sectional view partly in elevation illustrating another embodiment of the invention.

In Fig. 5, the invention has been modified so that it may be used in conditions where clean, dry gas is the pressure medium and where it may be desirable to provide a mercury trap so as to prevent the loss of mercury. In this form of the invention, the gas is discharged into the top 54 of the dampener and the direction of flow through the unit is reversed to that shown in Figs. 1, 2, 3, 4. A screen 55 serves to filter such gas and it is passed through opening 33 in spindle 32 and thence to the restriction means 28 and then to reservoir 13, which in this form of the invention is not provided with liquid 20.

The dampened pressure impulses are then discharged through opening 56 for actuation of indicating means as is more fully illustrated in Fig. 8.

Fig. 8 schematically illustrates an application of the modification shown in Fig. 5 to an orifice flow meter. An orifice is positioned as indicated at 57 in the flow line 4 and a mercury manometer is illustrated at 58 by which the pressure differential across the orifice 57 is to be measured. In order to obtain accurate readings, it is necessary to dampen the pressure impulses to the manometer in order that a differential in displacement of mercury may be determined. This necessitates a pressure dampener 60, 61 on each column of mercury 62 and 63 respectively.

Lines 64 and 65 are connected on each side of the orifice meter and to the dampeners 60 and 61 which communicate with mercury columns 62 and 63 respectively. Branch line 84 is connected therebetween with valves 71 and 72 therein respectively. Suitable valves 68, 69, 70, 71 and 72 are provided for operation of the unit. A pressure gauge is illustrated at 73 for measuring line pressure in flow line 4.

In the operation of the invention as illustrated in Fig. 8, valves 68, 69, 70 are closed initially prior to taking a reading. Valves 71 and 72 are open and dampener 60 is adjusted so that restriction means 28 is in maximum dampening position while the restriction means 28 of dampener 61 is in minimum dampening position.

Valves 68 and 69 are then opened and the restrictive means 28 of pulsation dampener 61 is adjusted until the fluctuation of the needle on gauge 73 is about 1 percent of full scale deflection.

Valves 71 and 72 are then closed and valve 70 is opened. The restriction means 28 of pulsation dampener 60 is then adjusted, or moved from its original starting position of maximum dampening so as to effect gradual fluctuation of the mercury columns 62 and 63. The restriction means 28 of dampener 61 is then readjusted so that the fluctuation of the mercury columns is about one percent of the full scale mercury fluctuation.

The difference in the heights of mercury columns 62 and 63 may then be noted and calculations as desired carried out.

Since the pulsation dampeners are arranged above the mercury columns, the reservoir 13 of each of the dampeners serves as a mercury trap to inhibit loss of the mercury upon causing a sudden opening of the valves prior to dampening.

Fig. 7 illustrates the modification of Fig. 2 being used to dampen the pressure impulses to an orifice flow meter. The lines 64 and 65 are again connected on each side of the orifice meter 57 and connect respectively to mercury columns 62 and 63 through dampeners 60 and 61 as described with regard to Fig. 8. However, as shown in Fig. 7, the dampeners 60 and 61 are below the mercury columns 62 and 63 whereas in Fig. 8 they are above the mercury columns. The valves and their manner of operation in practicing the present invention with an orifice flow meter are arranged similar to that shown in Fig. 8 and it is not believed necessary to repeat the foregoing paragraph herein.

Fig. 6 illustrates the modification of Fig. 1 used in conjunction with an orifice flow meter wherein the pipes and the space above the mercury columns are filled with liquid. Valves 20 and 81 are provided for filling the lines 64, 65 and branch line 84 connected therebetween as well as the meter space over the mercury columns 86 and 87. Pressure gauge 85 is air filled as previously discussed.

Initially, valves 68 and 69 are closed with restriction means 28 of pulsation dampener 60 in maximum dampening position, while restriction means 28 of pulsation dampener 61 is in minimum dampening position and valve 70 is in open position.

Valves 68 and 69 are then opened and restriction means 28 in pulsation dampener 61 is gradually adjusted until gauge 85 is fluctuating only about one percent of full scale deflection. Valve 70 is then closed and then restriction means 28 in dampener 60 is opened gradually so that fluctuation of the mercury in columns 62 and 63 occurs. The restriction means of pulsation dampener is then closed off until the fluctuation is about one percent of the full scale mercury deflection.

In Fig. 9, a typical pulsating pressure as shown by a conventional recorder chart is illustrated with the time scale enlarged.

It is to be noted that the load and unload sections of each cycle are not equal with respect to time. The arithmetic average 90, or a line drawn midway between the peaks and valleys of the curve is the value used ordinarily in determining the mean pressure applied. This procedure introduces an error unless the peaks and valleys are identical, since the true average pressure applied is the average or the areas under the curve. Thus in the case shown above, since the areas above the mid-point line are greater than the areas below the mid-point line, the true average would be represented by the dotted line 91 slightly higher than the mid-point line.

Since the present invention introduces a calibrated restriction means 28 which causes a time lag in the pressure change in the gauge element, the area average, or time $\times$ pressure $\times$ C average is obtained. Any person skilled in the art of measurement of flow is familiar with what the constant "C" represents. It is a factor which is governed by the temperature, density, viscosity, etc., to aid in calculating the true average area under the time-pressure curve as illustrated in Fig. 9. This is the case since it is easily seen that the longer time the interval allowed for the pressure to remain on the restriction, the greater will be the flow of dampening fluid through the threaded restriction and the higher the gauge pressure indication will be. Conversely, for the short duration cycle the pressure will not have as long a time to fall off and the gauge indication will be higher. Since on both cycles the readings are higher, the straight line damped pressure or true average will be higher than the mid-point average.

A common error, not yet discussed, that occurs in indicated or recorded pressure measurements where a pulsating condition exists is one which is due to overshoot or undershoot of the mechanical system responding to the pressure variation. This error is considerable in fast moving systems with appreciable mass is the link work and pen arm assemblies. This inability of the system to indicate the actual pressure at a given time can be very serious in near resonant conditions. It can only be corrected by slowing the mechanisms movement. The present invention, since it prevents the pulsating pressure from entering the gauge element, promptly eliminates this source of error.

While it is believed that the operation of the present invention is clear from the foregoing, by way of further illustration and summary it will be assumed that the pulsation dampener of the present invention is connected as illusttrated in Fig. 13 of the drawings.

The pulsating line is connected to the bottom connection 6 and the gauge or instrument is connected to the top pipe connection 5. The incoming pressure builds up on the dampening fluid in the seal-pot chamber or reservoir 13. In the case of light oils or gas the pressure is applied at the top surface of the liquid and heavy fluids settle to the bottom of the reservoir as they force the dampening fluid up through the port 17 and into the threaded restriction 28. Depending upon whether more or less threads are engaged when the hand wheel or disk 40 driving the threaded spindle 32 is turned in or out, more or less restriction or time lag is introduced into the system. Normal procedure is to start with the hand wheel cranked out to the minimum restriction setting. After allowing a short interval for the pressure to force the dampening fluid up into the gauge tube as indicated by the gauge responding to the pressure pulse, the hand wheel is turned to increase the restriction until only a slight pointer movement is indicated. This indication is the true average pressure in the line.

Fig. 10 illustrates the invention 2, as being used for dampening impulses to a control mechanism 100 which operates the valve 101 to regulate flow through the line 102. The pressure impulses which operate the control mechanism may arise from the line 102 by means of the communication 103, reducer or regulator valve 104 and thence to the bottom of the dampener as previously described herein. The dampened impulses are then conveyed through the line 103 to actuate the control mechanism for opening and closing of the valve 101. Alternatively, pressure impulses may be imparted through the line 105 from an external control or pilot valve which is being used to regulate or control the flow of fluid through line 102.

While one form or example as to the use of the present invention is described above, it seems obvious that the invention can be used in any arrangement where it is desired to lessen the pulsation effects of a control instrument mechanism.

Broadly, the invention relates to a pulsation dampener which provides a fluid barrier or seal pot between a pressure source and a pressure responsive means connected to the dampener in combination with a restriction means for dampening a pressure impulse imparted from the source to the fluid barrier and thence to the pressure indicating or pressure responsive means.

What is claimed is:

1. A pulsation dampener for pressure gauges comprising a body, there being a liquid reservoir in said body, a liquid in said reservoir, there being an inlet in said body for conducting pressure impulses to said reservoir, there being an outlet communicating with said reservoir for conveying the effect of the pressure impulses therefrom, and means cooperating with the reservoir for dampening the pressure impulses, said last mentioned means including a threaded area in the outlet communicating with said reservoir, a restrictor within said outlet, and threads on said restrictor engageable with the threaded area in the outlet to form a restriction in the outlet, and a passage through said restrictor for communicating the restriction in the outlet with the pressure gauge.

2. A pulsation dampener for pressure gauges comprising a body, there being a liquid reservoir in said body, there being an inlet for conducting pressure impulses to said reservoir, there being an outlet extending longitudinally of said body for communicating said reservoir with a pressure gauge, a restrictor in said outlet, cooperating engageable threaded areas on said restrictor and in said outlet forming a restriction within the outlet, there being an opening in said body intermediate the ends of said restrictor, and means for fitting within the opening for turning said restrictor whereby the amount of threaded engagement between said restrictor and the outlet may be varied to vary the dampening effect of the restriction in the outlet, and a passage through said restrictor for communicating the restriction in the outlet with the pressure gauge.

3. A pulsation dampener for pressure gauges comprising a body, there being a liquid reservoir in said body, there being an inlet in said body for conducting pressure impulses to said reservoir and there being an outlet passage for conducting pressure impulses from said reservoir, there being a window in said body intermediate the ends of the outlet passage, a spindle in the outlet, seal means between said spindle and outlet on both sides of the window, there being a passage longitudinally of said spindle for communicating the outlet on one side of the window with that portion of the outlet on the other side of the window, a threaded area on said spindle, and a threaded area in the outlet engageable therewith to form a restricted flow passage between said reservoir and the longitudinal passage in said spindle.

4. A pulsation dampener for pressure gauges comprising a body, there being a liquid reservoir in said body, there being an inlet in said body for conducting pressure impulses to said reservoir and there being an outlet passage for conducting pressure impulses from said reservoir, there being a window in said body intermediate the ends of the outlet passage, a spindle in the outlet, seal means between said spindle and outlet on both sides of the window, there being a passage longitudinally of said spindle for communicating the outlet on one side of the window with that portion of the outlet on the other side of the window, a threaded area on said spindle, a threaded area in the outlet engageable therewith to form a restricted passage between said reservoir and the longitudinal passage in said spindle, and means for turning said spindle in the window whereby said spindle may be moved to vary the amount of threaded engagement between said spindle and the outlet to vary the length of the restricted passage within the outlet.

References Cited in the file of this patent

UNITED STATES PATENTS

| | | |
|---|---|---|
| 1,422,485 | Shephard | July 11, 1922 |
| 1,898,257 | Nelson | Feb. 21, 1933 |
| 1,983,227 | Hall et al. | Dec. 4, 1934 |
| 2,052,696 | Christensen | Sept. 1, 1936 |
| 2,191,990 | Jordan | Feb. 27, 1940 |
| 2,226,545 | Blasig | Dec. 31, 1940 |
| 2,277,534 | Thompson | Mar. 24, 1942 |
| 2,342,904 | Sledge | Feb. 29, 1944 |
| 2,402,729 | Buchanan | June 25, 1946 |
| 2,515,394 | Clarkson | July 18, 1950 |
| 2,518,832 | Stephens | Aug. 15, 1950 |
| 2,568,123 | Goldberg | Sept. 18, 1951 |
| 2,580,999 | Conrad | Jan. 1, 1952 |
| 2,629,403 | Allen | Feb. 24, 1953 |

FOREIGN PATENTS

| | | |
|---|---|---|
| 578,632 | Great Britain | July 5, 1946 |
| 746,797 | Germany | Dec. 27, 1944 |